United States Patent [19]
Klinedinst et al.

[11] Patent Number: 4,886,443
[45] Date of Patent: Dec. 12, 1989

[54] BLOW MOLDED BOTTLE EXTRACTION, TRIMMING AND DISCHARGE APPARATUS

[75] Inventors: Paul W. Klinedinst, Windsor; Thomas Smeltzer, York, both of Pa.

[73] Assignee: Graham Engineering Corporation, York, Pa.

[21] Appl. No.: 343,605

[22] Filed: Apr. 27, 1989

Related U.S. Application Data

[62] Division of Ser. No. 199,528, May 27, 1988, Pat. No. 4,834,643.

[51] Int. Cl.4 .............................................. B29C 49/70
[52] U.S. Cl. .................................................... 425/537
[58] Field of Search ......................................... 425/537

[56] References Cited

U.S. PATENT DOCUMENTS

| | | | |
|---|---|---|---|
| 2,032,127 | 2/1936 | Holmes | 82/124 |
| 2,359,432 | 10/1944 | McNamara | 414/744 |
| 2,541,249 | 2/1951 | Hobson | 264/524 |
| 3,060,497 | 10/1962 | Boyer | 425/537 |
| 3,145,243 | 8/1964 | Hagen | 264/536 |
| 3,351,981 | 11/1967 | Rupert | 425/292 |
| 3,382,531 | 5/1968 | Hager | 425/4 R |
| 3,417,428 | 12/1968 | Rupert | 425/4 R |
| 3,464,084 | 9/1969 | Thompson | 425/527 |
| 3,469,076 | 9/1969 | Saslawsky | 219/383 |
| 3,596,315 | 8/1971 | Yoshikawa | 425/527 |
| 3,763,297 | 10/1973 | Del Piero et al. | 264/98 |
| 3,778,213 | 12/1973 | Settembrini | 425/537 |
| 3,872,203 | 3/1975 | Yoshikawa et al. | 264/94 |
| 3,954,186 | 5/1976 | Hafele | 414/731 |
| 3,994,651 | 11/1976 | Kamibayashi | 425/297 |
| 4,030,650 | 6/1977 | Oberloier | 225/100 |
| 4,124,668 | 7/1978 | Frohn | 264/40.1 |
| 4,150,080 | 4/1979 | Hagen | 264/523 |
| 4,251,203 | 2/1981 | Oas | 425/537 |
| 4,272,233 | 6/1981 | Cochran | 425/526 |
| 4,290,995 | 9/1981 | Oas | 264/521 |
| 4,305,904 | 12/1981 | Black | 264/536 |
| 4,310,112 | 1/1982 | Huss | 225/3 |
| 4,361,531 | 11/1982 | Black | 264/161 |
| 4,380,423 | 4/1983 | Aoki | 425/289 |
| 4,382,760 | 5/1983 | Wiatt et al. | 425/537 |
| 4,419,063 | 12/1983 | Heise | 425/107 |
| 4,445,406 | 5/1984 | Thatcher | 82/46 |
| 4,479,772 | 10/1984 | Kleimenhagen | 425/526 |
| 4,487,568 | 12/1984 | Wiatt et al. | 425/534 |
| 4,536,150 | 8/1985 | Smith | 425/537 |
| 4,604,044 | 8/1986 | Hafele | 425/525 |
| 4,614,018 | 9/1986 | Krall | 29/33 |
| 4,752,206 | 6/1988 | Nowicki et al. | 425/537 |

*Primary Examiner*—Willard Hoag
*Attorney, Agent, or Firm*—Thomas Hooker

[57] ABSTRACT

An apparatus for extracting, trimming and discharging blow molded plastic bottles includes a rotary turntable and a plurality of bottle transfer units spaced around the turntable. A drive indexes the units past the stations at which bottles are extracted from mold halves in an inverted position, righted, trimmed and discharged to a take away conveyor.

8 Claims, 13 Drawing Sheets

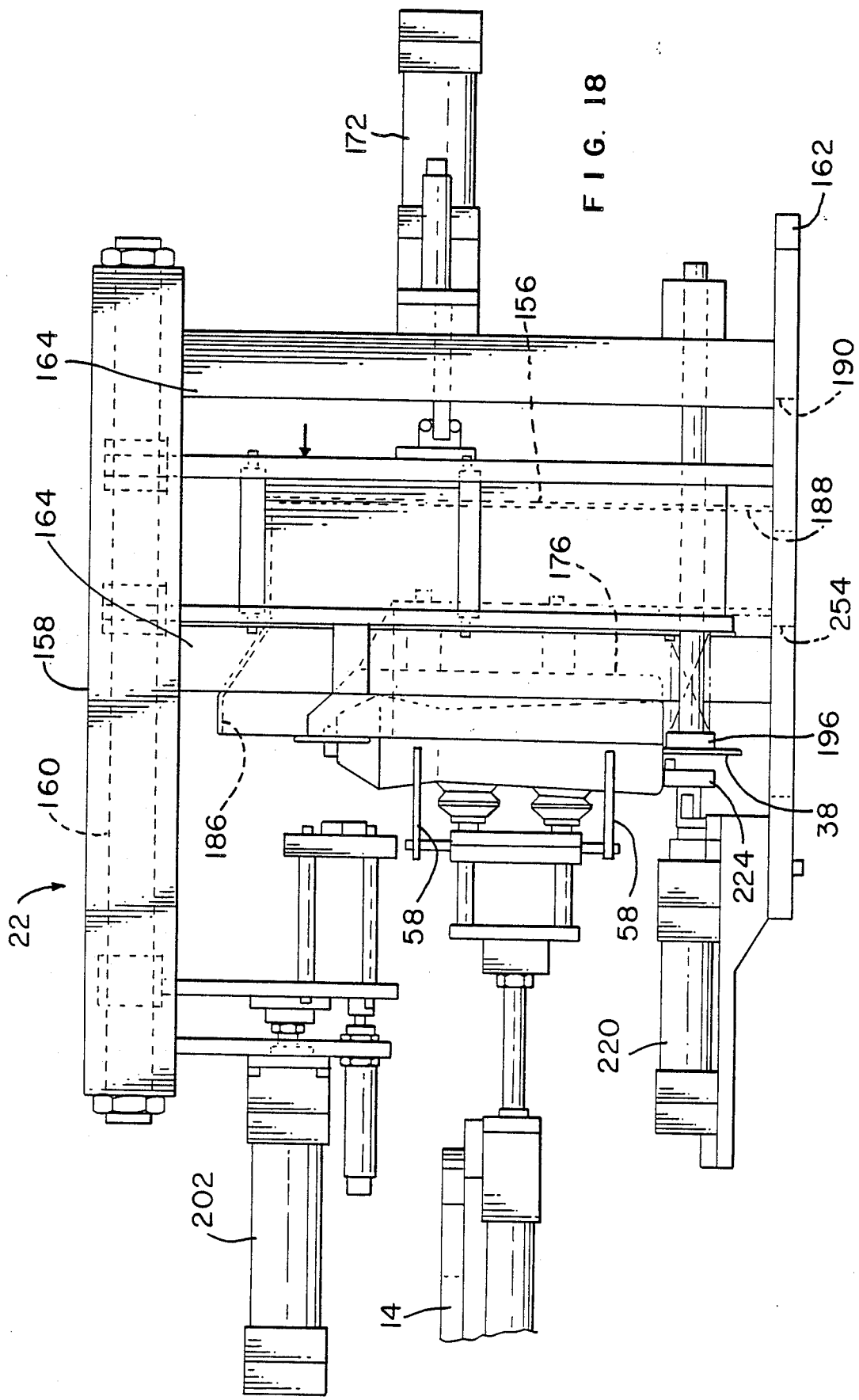

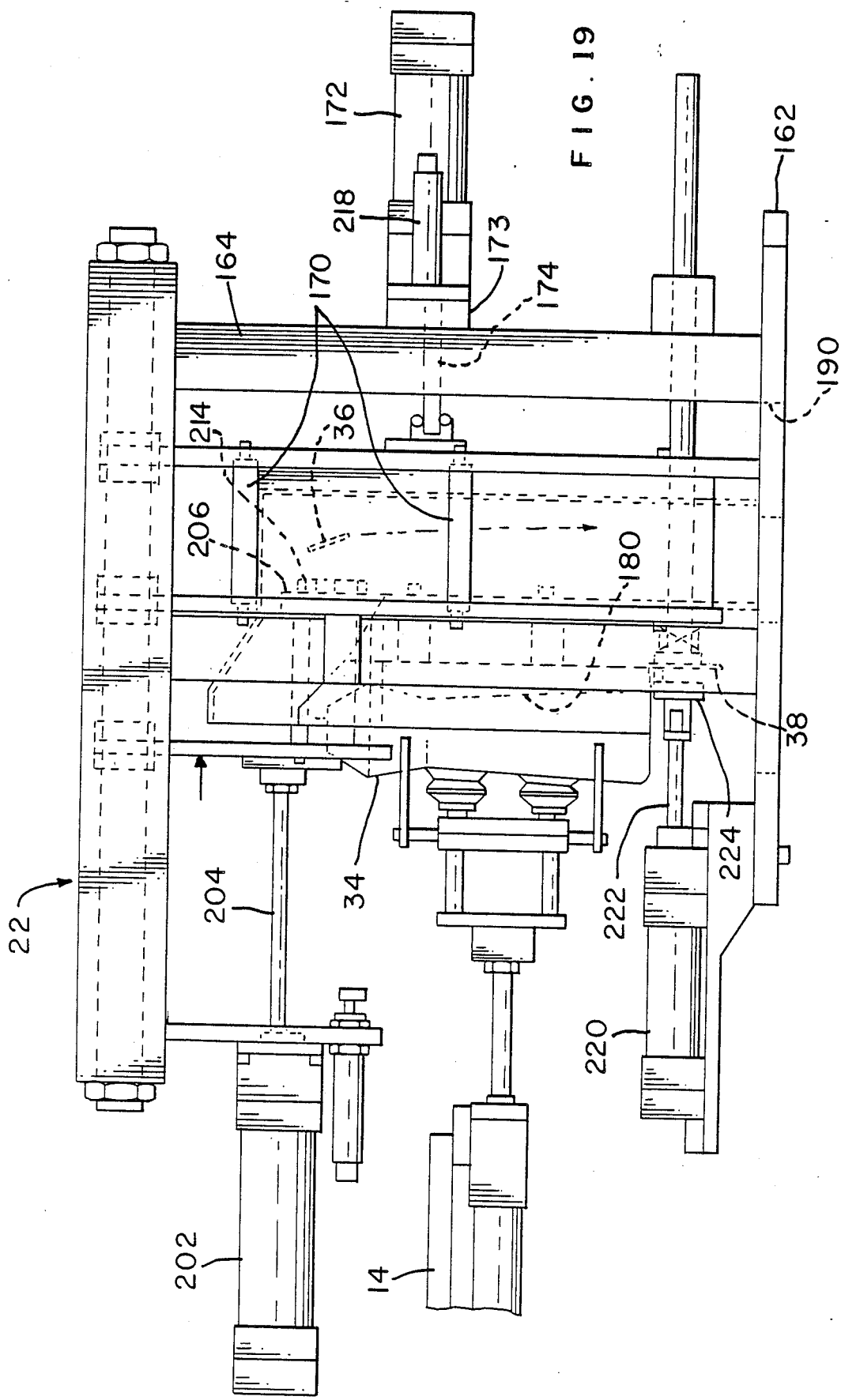

BLOW MOLDED BOTTLE EXTRACTION, TRIMMING AND DISCHARGE APPARATUS

This is a division, of application Ser. No. 199,528, filed May 27, 1988 now U.S. Pat. No. 4,834,643.

The invention relates to an improved apparatus for extracting, trimming and discharging blow molded plastic bottles, particularly bottles blow molded in an inverted position with the necks of the bottles at the bottom of the mold cavities and the bottom of the bottles at the top of the mold cavities.

It is conventional to extract blow molded bottles from molds of a blow molding machine, trim away flash from the bottles and then discharge the bottles for a subsequent operation, commonly filling. In some situations, the bottle may be packaged for delivery to a remote facility for filling. Preferably these operations must be performed rapidly and reliably. The apparatus performing the operations must be capable of handling bottles at a rate equal to the rate at which the blow molding machine produces the bottles. Transport and trimming of the bottles requires that the bottles be accurately positioned to permit trimming without injury to the bottle sidewall.

The plastic parison captured between the molds of a blow molding machine occasionally is not expanded to the desired shape of a bottle but rather has assumed an irregular unblown shape, commonly referred to as a "glob". Tail flash attached to the "glob" extends outwardly of the cavity. "Globs" are most commonly formed during start-up of blow molding machines when operating parameters have not been fully reached. It is impossible to determine whether closed mold halves have produced perfectly formed bottles or "globs". Disposal of "globs" causes problems, particularly where carriers are used for transporting the molded bottles away from an extraction station. The carriers are specifically designed to attach to the molded bottle, often by the use of one or more suction cups which are vacuum adhered to the smooth surfaces of the bottles. Vacuum cups will not adhere to the surface of a "glob". This type of vacuum holder would drop "globs" extracted from between the open mold halves by fingers engaged in the "glob" tail flash, allowing the "glob" to fall back into the blow molding machine, commonly between the mold halves. Dropped "globes" can ruin subsequently formed bottles and necessitate shutting down the blow molding machine to permit removal.

In the present invention, the apparatus includes a rotary turntable having a number of transfer units spaced around the turntable, each transfer unit having indexing suction cups for picking up bottles which have been extracted from between mold halves by engaging the tail flash and lifting the bottles upwardly a distance above the mold halves. When raised, the bottles are accurately located between nest or alignment plates following which vacuum is applied to the suction cups for pickup. After pickup, the tail flash is released.

A reject-take away assembly automatically extends a tray between the mold halves and the elevated bottles to catch any possible "glob" which would fall down from the extraction tooling after release of the tail flash. A wiper moves along the tray to discharge dropped "globs" onto a discharge conveyor for transport away from the blow molding machine. The tray is automatically retracted from the extraction station so it does not interfere with withdrawal of subsequent bottles, and possible "globs", from the mold halves.

The transfer unit carries the vacuum-held inverted bottles away from the extraction station and then rotates the bottles through 180 degrees to the upright position with neck flash at the tops of the bottles and the tail flash at the bottoms of the bottles.

Next, the bottles are indexed to a trim station at which both the neck and tail flash is severed from the bottles without injury to the bottles. The bottles are accurately aligned in concave bottle nests prior to severing to assure that the tooling removing the flash does not cut or injure the walls of the bottles. Severed neck flash is captured within a discharge chute and gravity falls from the machine.

Following retraction of the flash trimming tooling, the turntable is indexed to move the trimmed bottles to a discharge station where the bottles are transferred from the indexing vacuum cups to vacuum cups located radially outwardly of the transfer assembly and are then lowered along an inclined path and deposited on a conveyor moving away from the path for a subsequent operation. The inclined descent moves the bottles partially along the conveyor path prior to discharge on the path, thereby reducing shocks and possible injury to the bottles during the transfer to the conveyor.

The apparatus rapidly and accurately performs these operations at high production rates compatible with continuous rotary or other types of high speed blow molding machines. The high production rate is particularly useful when the machine is used in conjunction with a blow molding machine where a parison is extruded down between the mold halves and onto a blow pin following which the mold halves close and the parison is blown to form an inverted bottle with a mouth at the bottom of the mold cavity surrounding the blow pin.

Other objects and features of the invention will become apparent as the description proceeds, especially when taken in conjunction with the accompanying drawings illustrating an example of the invention.

BRIEF DESCRIPTION OF THE DRAWINGS

FIGS. 18 and 19 are views similar to FIG. 14 with the tooling shown partially and fully closed, respectively;

DESCRIPTION OF THE APPARATUS

Figure 1:
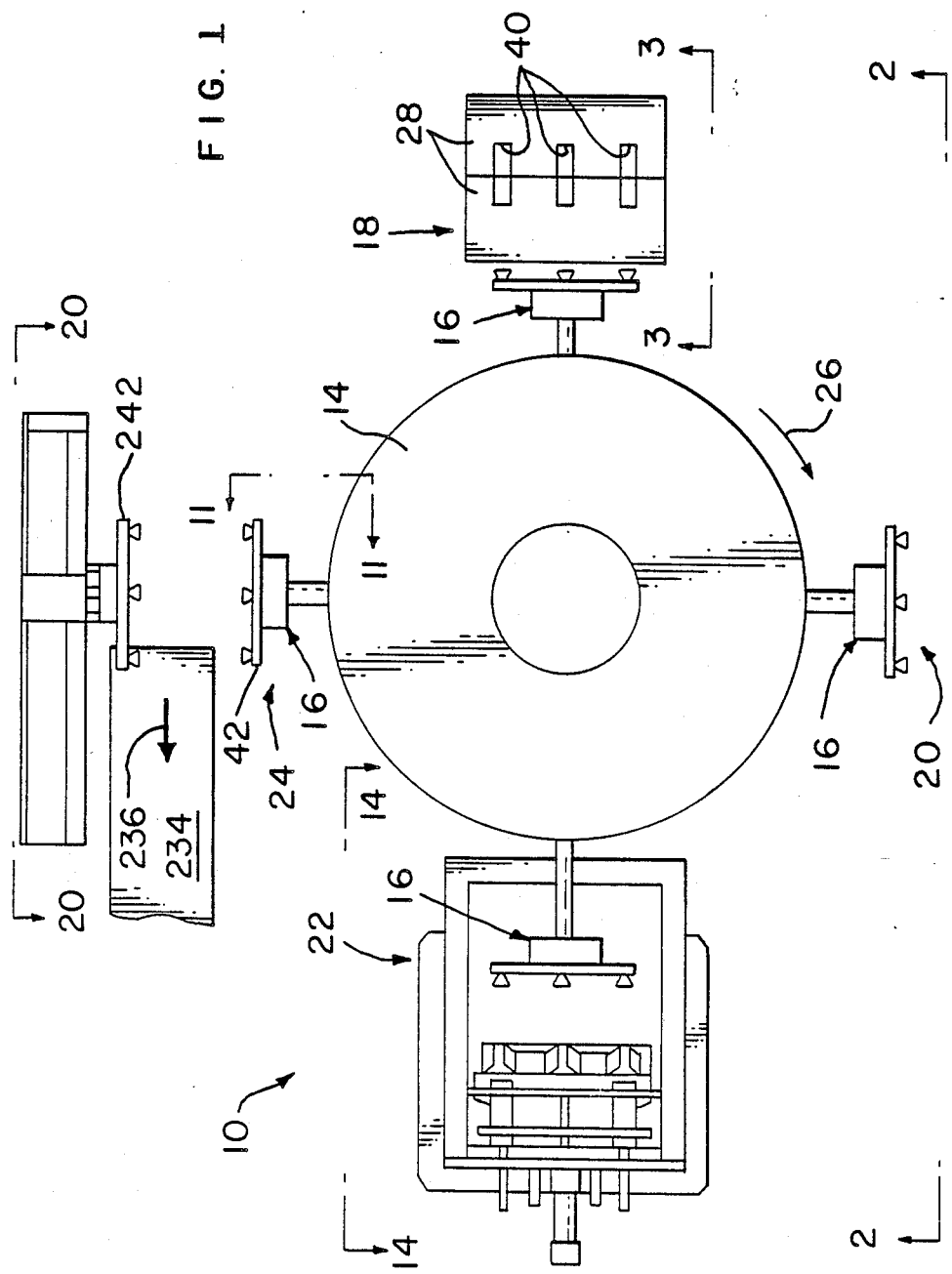
FIG. 1 is a schematic plan vies, partially broken away of the invention.

Apparatus 10 includes a support frame 12 partially illustrated in the drawings and a horizontal rotary turntable 14 mounted on the frame and carrying four 90-degree spaced transfer units 16. Extraction station 18, rotation station 20, trim station 22 and discharge station 24 are spaced around the turntable at 90 degree intervals. A turntable drive (not illustrated) indexes the turntable through 90 degree steps in the direction of arrow 26 to move the transfer units between adjacent stations. The turntable is dwelled between indexing steps with the transfer units located at the stations as shown in FIG. 1.

The apparatus is used in conjunction with a blow molding machine (not illustrated) having one or more pairs of mold halves 28 which close on parisons so that, when blown, the parisons form three inverted bottles 32. Each bottle is blown with two sections of joined shoulder flash 36 and a single section of tail flash 38. Mold halves 28 include three cavities 34. The blow molding machine moves closed mold halves to the extraction station 18 with the tail flash 38 of the bottles confined in the blow mold cavities 34 extending into the small extraction recesses 40 the parting line between the closed mold halves.

Figure 11:
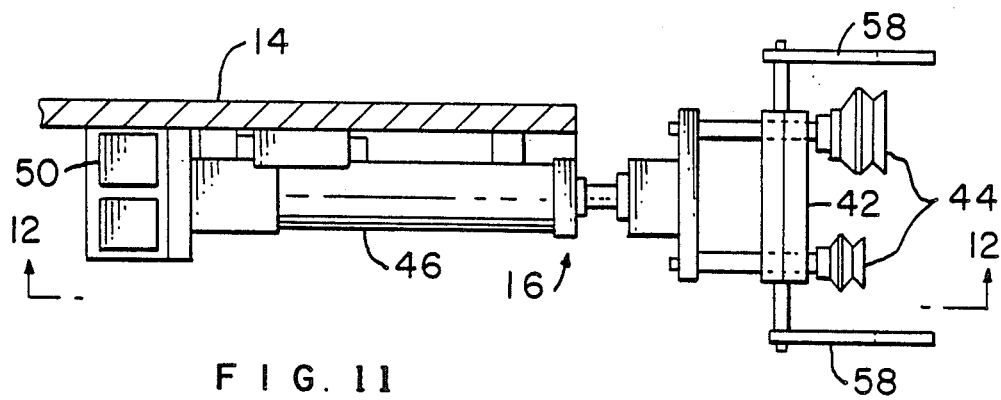
FIG. 11 is a view of the transfer assembly taken along line 11—11 of FIG. 1.
Figure 12:
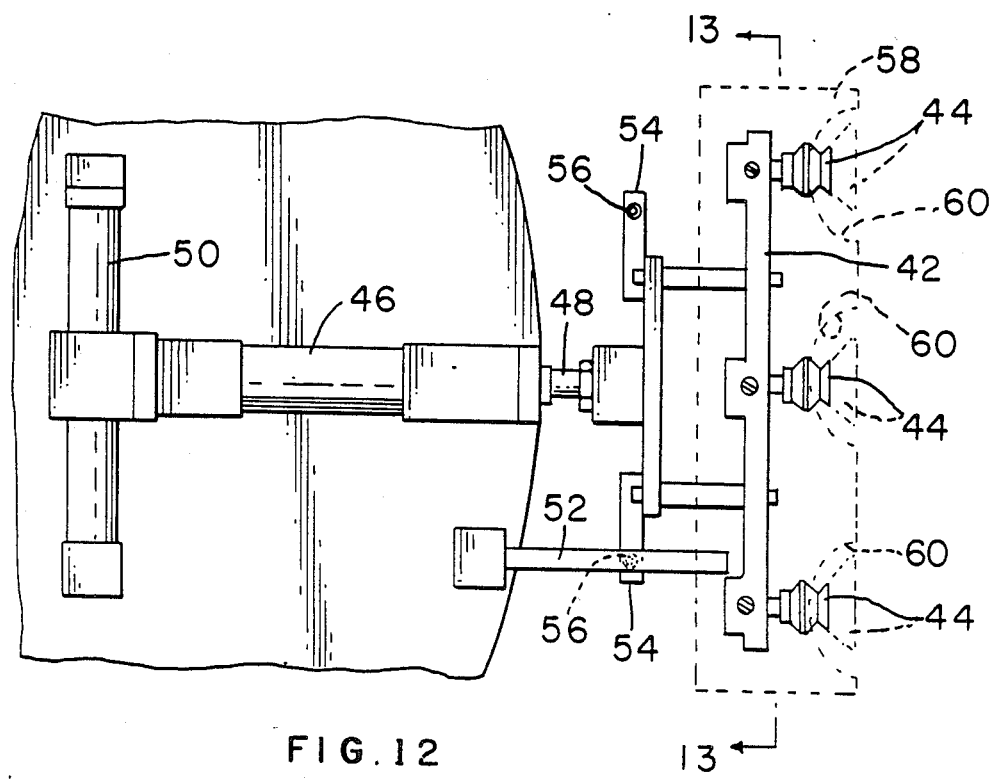
FIGS. 12 and 13 are views taken along lines 12—12 and 13—13 of FIGS. 11 and 12, respectively.
Figure 13:
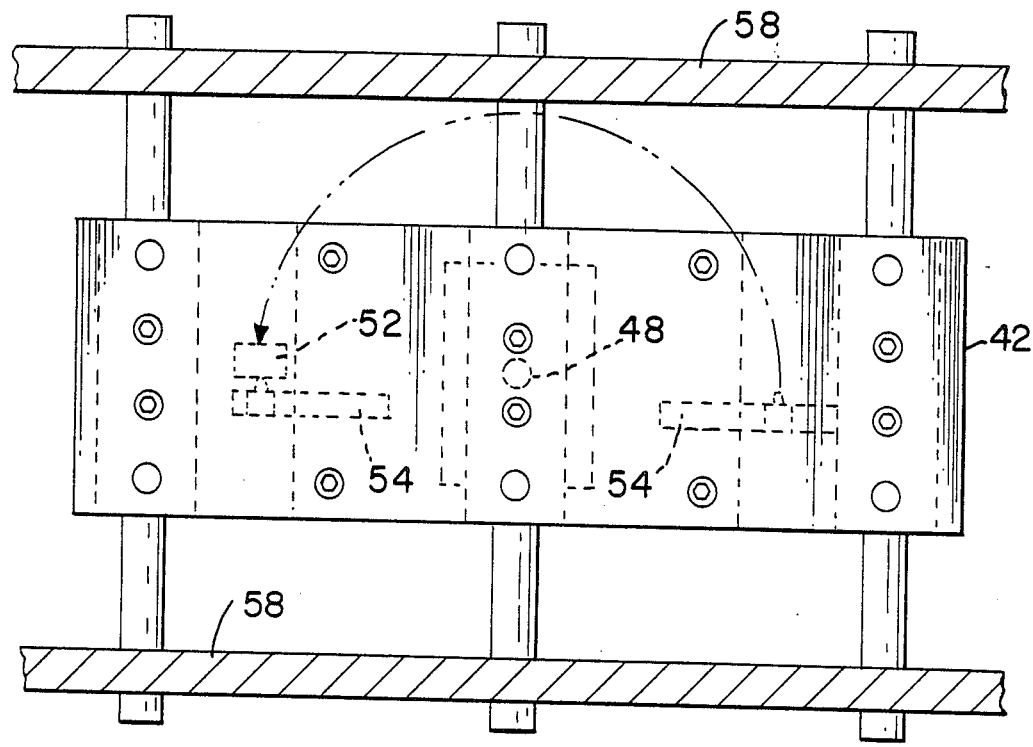
Figure 15:
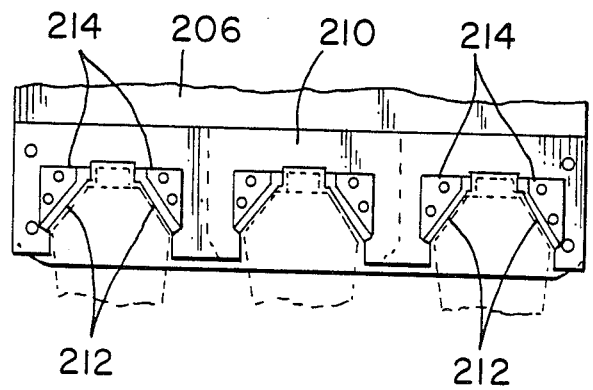
FIGS. 15 and 16 are views taken along lines 15—15 and 16—16 of FIG. 14, respectively.

As shown in FIGS. 11 and 12 each unit 16 is mounted on the lower surface of rotary turntable 14 and includes a transfer plate 42 located radially outwardly of the turntable supporting three pairs of outwardly facing and vertically spaced indexing suction cups 44. Extension and retraction cylinder 46 is secured to the lower surface of turntable 14 and includes a piston rod 48 which extends radially outwardly to a frame on plate 42 so that extension and retraction of the cylinder radially extends and retracts the plate. Rotation cylinder 50 is also secured to the lower surface of turntable 14 and engages rod 48 through a rack and pinion drive so that extension and retraction of rotation cylinder 50 rotates the rod and plate 42 through arc of 180 degrees. Rotary alignment rod 52 is mounted on the lower surface of the turntable and extends outwardly of the turntable parallel to rod 48. The frame connecting rod 48 to plate 42 carries a pair of stop arms 54 which, as shown in FIG. 12, extend radially to either side of the rod 48. FIG. 13 illustrates that the rotary alignment rod 52 is at the same level as piston rod 48. In the illustrated position of plate 42 both of the stop arms 54 are located below the cylinder and rod. Each stop arm includes a resilient bumper 56 for providing a soft engagement with the alignment rod. See FIG. 12.

Actuation of cylinder 50 rotates plate 42 through 180 degrees to move one of the stop arms 54 out of engagement with the alignment rod and the other stop arm into engagement with the alignment rod. The resilient stops 56 are adjustably mounted in the arms to assure that cylinder 50 rotates the plate the required 180 degrees. Plate 42 is rotated to move inverted bottles extracted from the mold halves to the upright position. Rod 52 is sufficiently long to control rotation when cylinder 46 is extended.

Each unit 16 includes pressure fluid circuitry connected to the suction cups 44 to draw and control vacuum through the cups 44 as required during operation of apparatus 10.

The units 16 each carry a pair of parallel nest plates 58 mounted above and below transfer plates 42 and projecting outwardly beyond the suction cups 44. The nest plates have recesses 60 formed in their radial outer edges and aligned above and below the pairs of suction cups 44. The recesses are shaped to conform to the outer configuration of bottles 32 held on the transfer units by the suction cups.

The extraction station 18 includes a bottle extractor 70 having a rectangular frame 72 mounted on apparatus frame 12 above the mold halves 28 when located at the station and having horizontal top and bottom cross members 74 and 76 and a pair of spaced vertical side members 78. The frame is mounted slightly to one side of the parting line of closed mold halves when at the extraction station. See FIG. 3.

A pair of rodless air cylinders 80 are mounted on side members 78 with the pistons in the cylinders connected to a support 82 extending across the width of the frame 72. The support carries three like bottle gripping assemblies 84, an air cylinder drive 86 and a pair of gripping fingers 88 extending below the cross support 82 for engaging the tail flash of the bottles confined in the closed mold halves. The fingers are opened and closed by air cylinders 89. Shock absorbers 90 mounted on the top and bottom cross members 74 and 76 cushion movement of the support 82 at the ends of its stroke.

Frame 72 also includes a cross member 92 extending between side members 78 a short distance above cross member 76 and supporting air cylinder 94 having a piston rod 96 extending toward the adjacent transfer unit 16. Two spaced nest plates 98 are mounted on the end of rod 96. Plates 98 are similar to nest plates 58 on the transfer unit and include recesses conforming to the shape of the bottles to orient the bottles 32. Rotation of the nest plates 98 is prevented by guide pins 100 extending from the support for the nest plates through bores in supports on cross member 92. The pins 100 may carry stops to limit linear movement of the nest plates. Extension and retraction of cylinder 94 moves the nest plates 98 toward and away from bottles extracted from mold halves 28.

Figure 2:
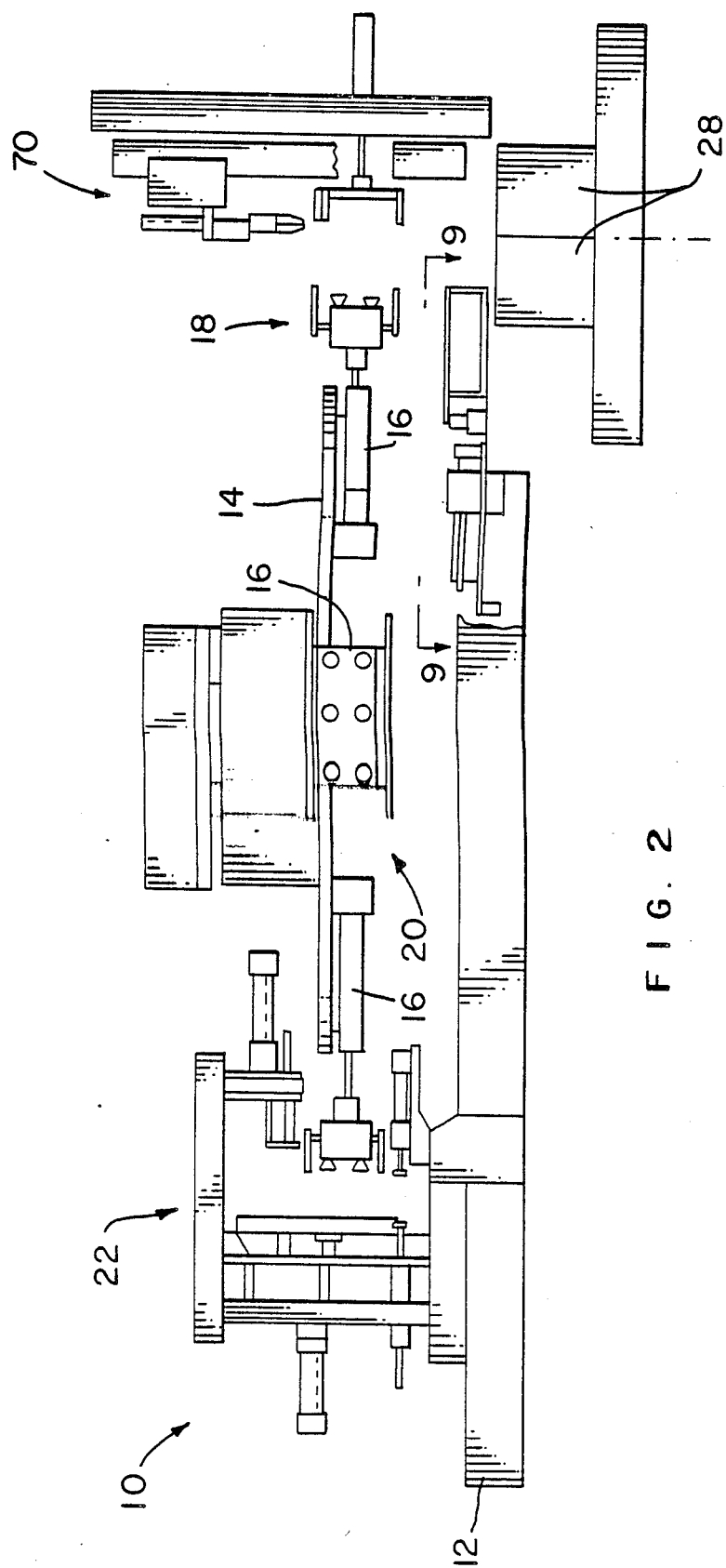
FIG. 2 is a view taken along 2—2 of FIG. 1.
Figure 9:
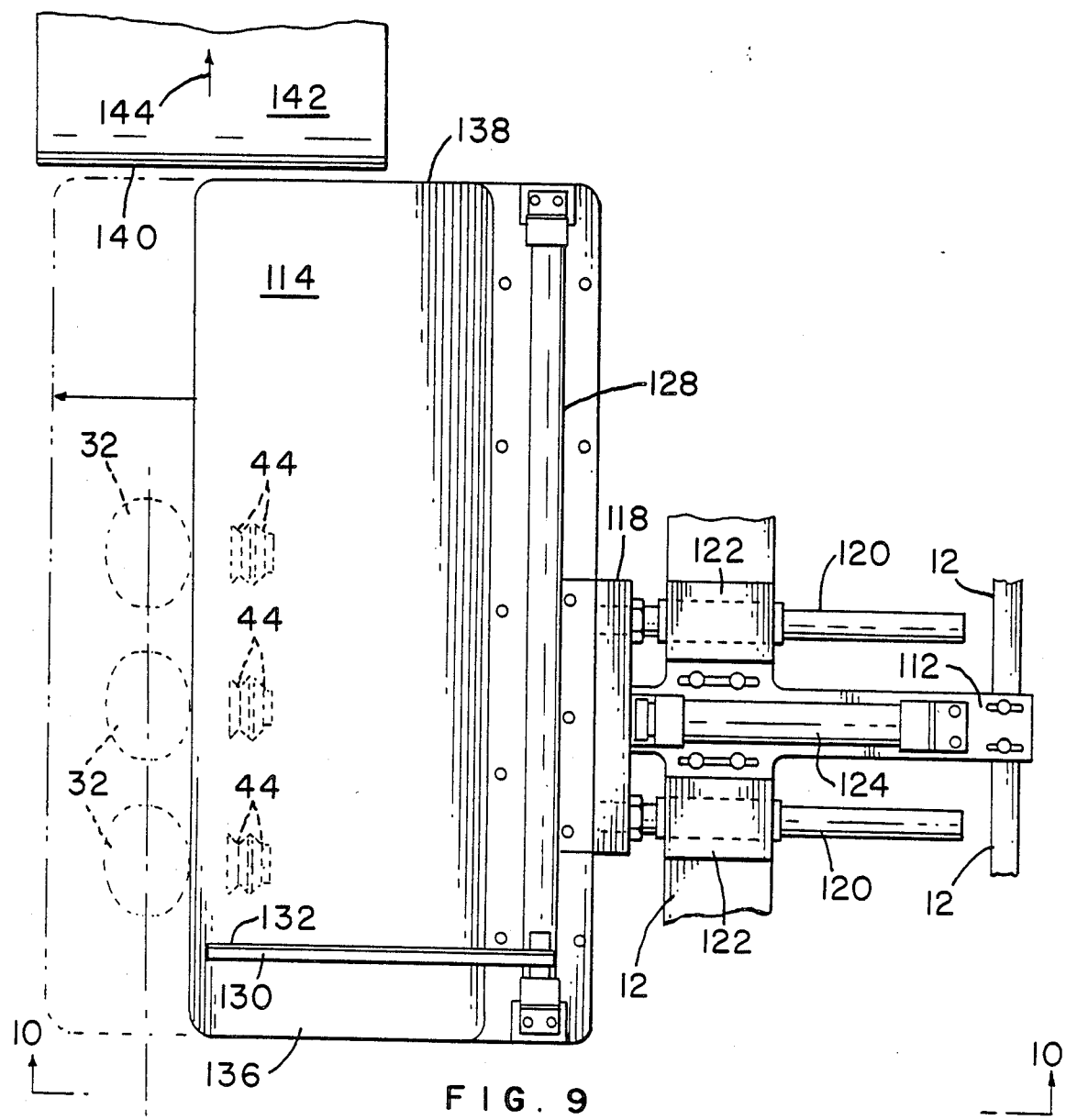
FIGS. 9 and 10 are views taken along lines 9—9 and 10—10 of FIGS. 2 and 9, respectively.
Figure 10:
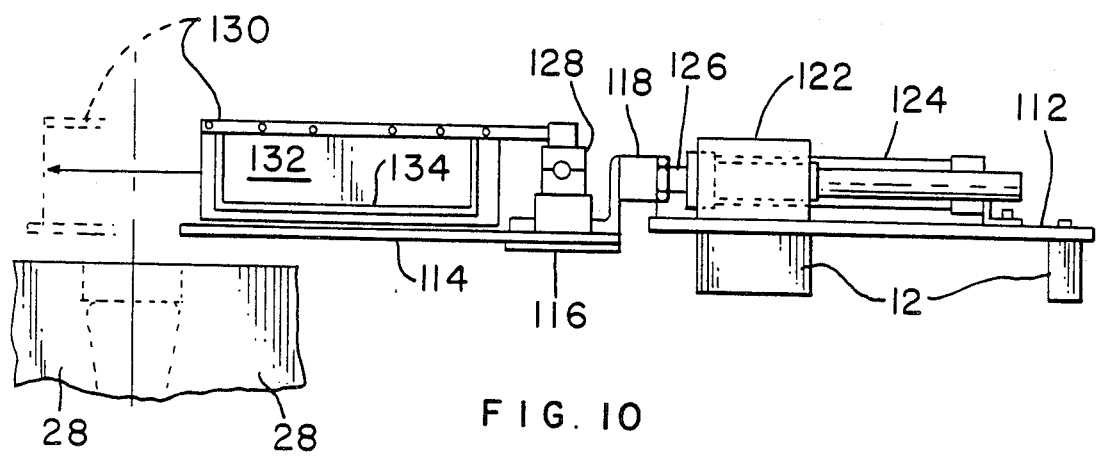

Reject-take away assembly 110 shown in FIG. 2, 9 and 10 is located at a level below the turntable 14 at the extraction station 18. Plate 112 supports the assembly and is, in turn, mounted on frame 12. The assembly includes a flat plastic tray 114 secured to a support plate 116 extending under the tray and a mounting bracket 118 secured to the top of the tray. The mounting bracket carries a pair of parallel slide pins 120 which extend through bushings 122 on plate 112. Air cylinder 124 is mounted on the plate 112 and includes piston rod 126 connected to the bracket 118 so that extension and retraction of the air cylinder moves the tray 114 between the dotted line extended and solid line retracted positions illustrated in FIGS. 9 and 10.

Rodless air cylinder 128 is mounted on the side of the tray 114 adjacent the pins 120 and cylinder 124. The piston of cylinder 128 is connected to a support rod 130 which extends over tray 114 and carries a wiper 132, preferably formed from sheet plastic material. The wiper extends from the rod down to the tray. A U-shaped support 134 on the rod 130 holds the wiper 132 against flexing during movement along the tray from end 136 to end 138 in response to extension of cylinder 128.

The upstream end 140 of discharge conveyor 142 is located at tray end 138 so that when tray 114 is moved to the extended position the end 138 is level with conveyor end 140. Movement of the wiper 132 sweeps misformed reject bottles or "globs" fallen on the tray onto the conveyor 142 for movement downstream in the direction of arrow 144 and discharge into a scrap receptacle. When extended, tray 144 is located above the mold halves and prevents deformed bottles or "globs" of plastic from falling down into the blow molding machine upon release of the grippers.

At rotation station 20 cylinder 50 is actuated to rotate the three bottles 180 degrees from the inverted position to the upright position.

The tooling at trim station 22 is illustrated in FIGS. 14 through 19. Each 90 degree rotation of turntable 14 moves three upright bottles 32 to the station in positions shown in FIGS. 14 and 17. The tooling at the trim station includes bottle support unit 150, neck flash trim unit 152, tail flash trim unit 154 and a flash discharge chute 156, all of which are mounted on frame 12.

Figure 14:
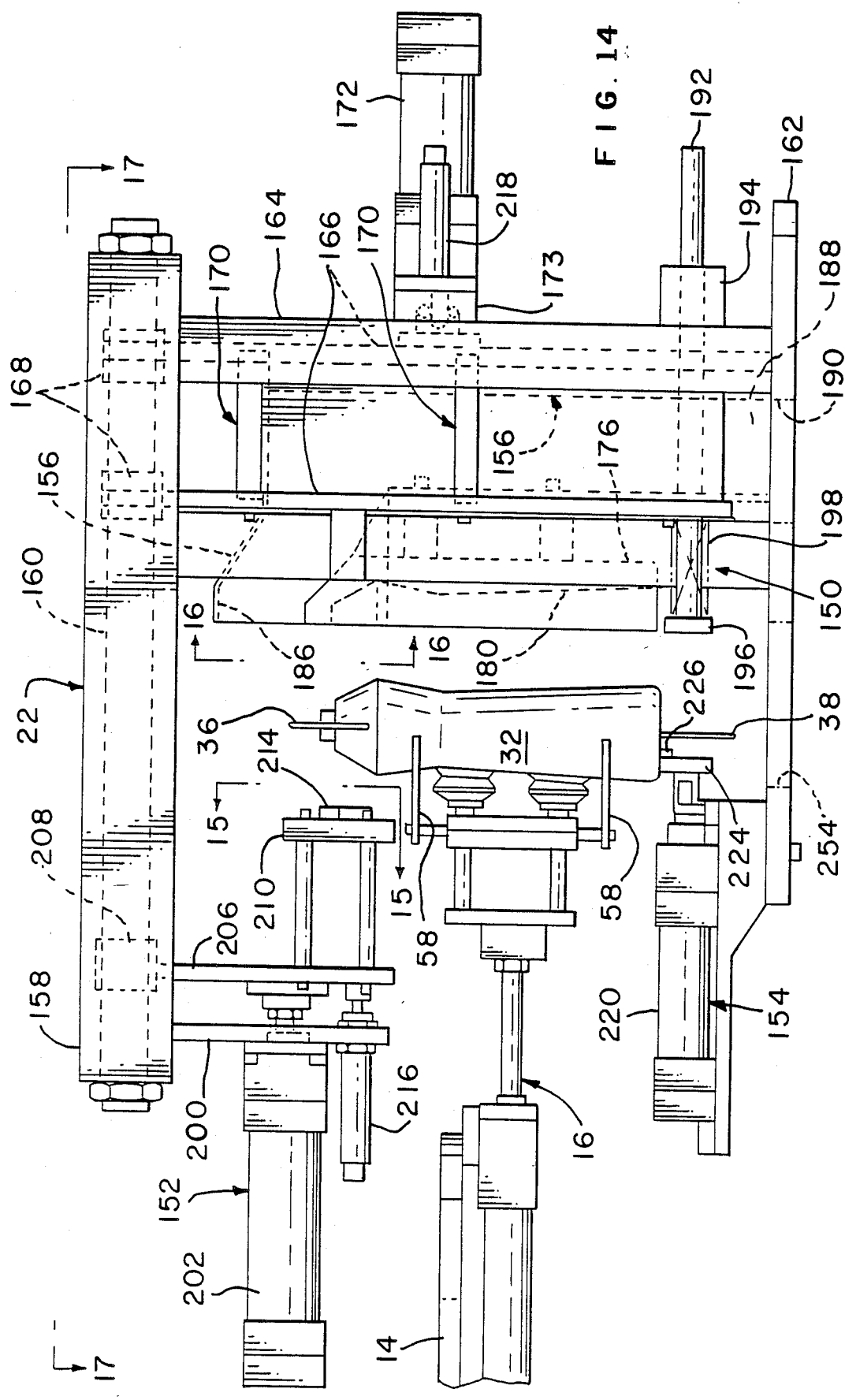
FIG. 14 is a view of the trim station taken along line 14—14 of FIG. 1.

As located in FIG. 14, the neck flash and tail flash trim units 152 and 154 are located radially inwardly of the circumferential path along which bottles 32 are indexed to the trim station. The bottle support unit 150 and discharge chute 156 are located radially outwardly of the path.

A rectangular sub-frame 158 located above the tooling at the trim station 120 is connected to a support plate 162 on frame 12 by posts 164. The sub-frame carries a pair of spaced slide rods 160. Bottle support unit 150 includes a pair of spaced vertical plates 166 which are slidably mounted on rods 160 by bushings 168 to permit movement of the unit toward and away from the bottles 32 held on the transfer unit. The plates 166 are connected together by a number of spacing rods 170 shown in FIGS. 14, 18 and 19. Air cylinder 172 is mounted on a frame cross member 173 extending between posts 164 with its piston rod 174 connected to the adjacent plate 166 so that extension and retraction of the cylinder moves the support unit toward and away from the bottles.

The bottle support unit 150 includes three bottle nests 176 each located radially outwardly of a bottle 32 at the trim station. The nests are connected to adjacent plate 166 by rods 178. The surfaces 180 of the nests facing the bottles are concave and conform in shape to the adjacent sides of the bottles so that when cylinder 172 is extended the nests are moved against and support the bottles in place prior to trimming as shown in FIGS. 18 and 19. The nests are located behind the bottles in the shoulder and neck areas and do not extend laterally of the bottles, thereby permitting the tooling in the neck flash trimming unit 152 to engage the neck flash and neatly trim the neck flash from the bottles.

Figure 16:
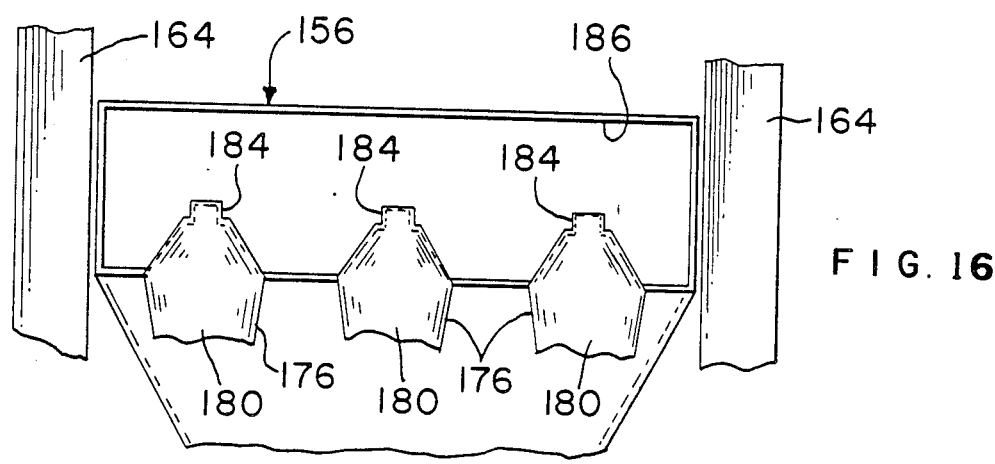
Figure 17:
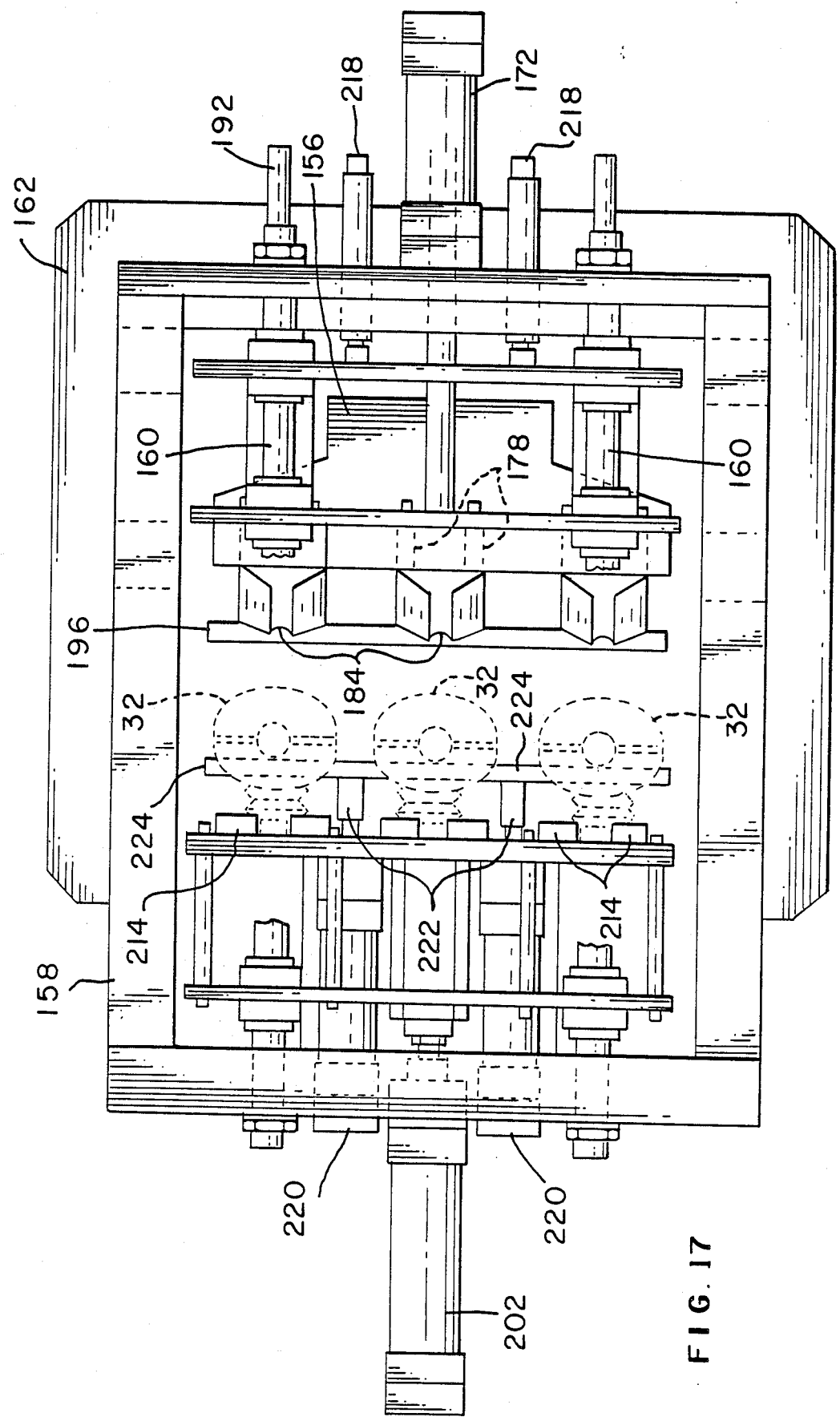
FIG. 17 is a top view of the trim station, partially broken away, taken along line 17—17 of FIG. 14.

The shape of the nests is more clearly illustrated in FIGS. 16 and 17. The nest recesses do not extend around the bottoms of the bottles. The nest extend upwardly into the mouth 186 of flash discharge chute 156.

As illustrated in FIG. 14, chute 156 angles downwardly from mouth 186, extends to an opening in the adjacent plate 166, narrows and then extends downwardly between the plates 166 to a discharge end 188 at plate 162. Shoulder flash trimmed from bottles 32 falls through mouth 186, into and down the chute to the discharge end 188 and ultimately falls through an opening 190 in plate 162 and into a discharge receptacle (not illustrated). Extension and retractions of cylinder 172 moves the chute back and forth along plate 162 and past opening 190. This movement assures that all the flash in the chute falls through the opening. As illustrated in FIG. 16, the chute 156 has a maximum width greater than the spacing of the tops of bottles 34 at mouth 186 and narrows below the mouth. Rods 170 do not extend into the chute.

The bottle support unit carries two guide pins 192 which extend through bores in plates 166 and bushings 194 mounted on posts 164 below cylinder 172. The pins 192 carry flash backup plate 196, which extends across the unit a short distance below the lower ends of nests 176 opposite the tail flash 38 extending down from the bottles held in the trim station. Springs 198 are confined on pins 192 between the adjacent plate 166 and plate 196 to bias the pins to the position shown in FIG. 14 where the outer surface of the plate is located below the circumferential edges of the nests. Stops (not illustrated) hold the pins in these positions but permit retraction of the plate and pins during severing of the tail flash.

The neck flash trimming unit 152 includes a fixed vertical plate 200 mounted on and extending below the radial inner end of frame 158. The plate supports neck flash trim cylinder 202 having a piston rod 204 connected to a second vertical plate 206 carrying bushings 208 mounted on slide rods 160. Plate 206 carries a vertical trim plate 210 having cutouts 212 located opposite the tops of the bottles 32 with cutout tooling 214 mounted on the surface of plate 210 facing the bottles and having cutting edges conforming to the outer surfaces of the bottles at the shoulder flash 36 surrounding the recesses 212. Plate 200 carries shock absorbers 216 to cushion the return of plate 206 to the retracted position shown in FIG. 14.

The tail flash trim unit 154 includes a pair of air cylinders 220 mounted on plate 162 having piston rods 222 joined to a flash severing plate 224 extending underneath the three bottles held at the trim station opposite to plate 196. Plate 224 carries a flash clamping projection on the top of outer face adjacent the bottom of the bottle 32 and extending along tail flash 38.

Figure 21:
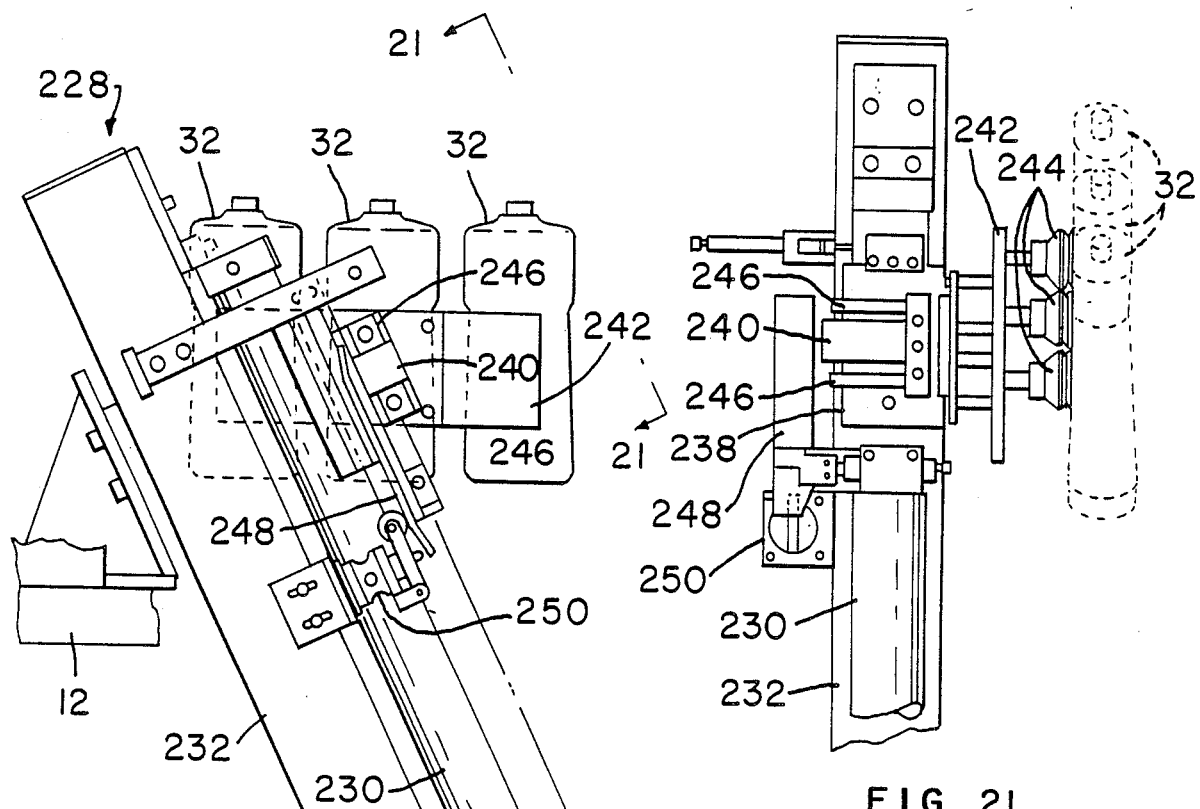
FIG. 21 is a view taken along line 21—21 of FIG. 20.
Figure 20:
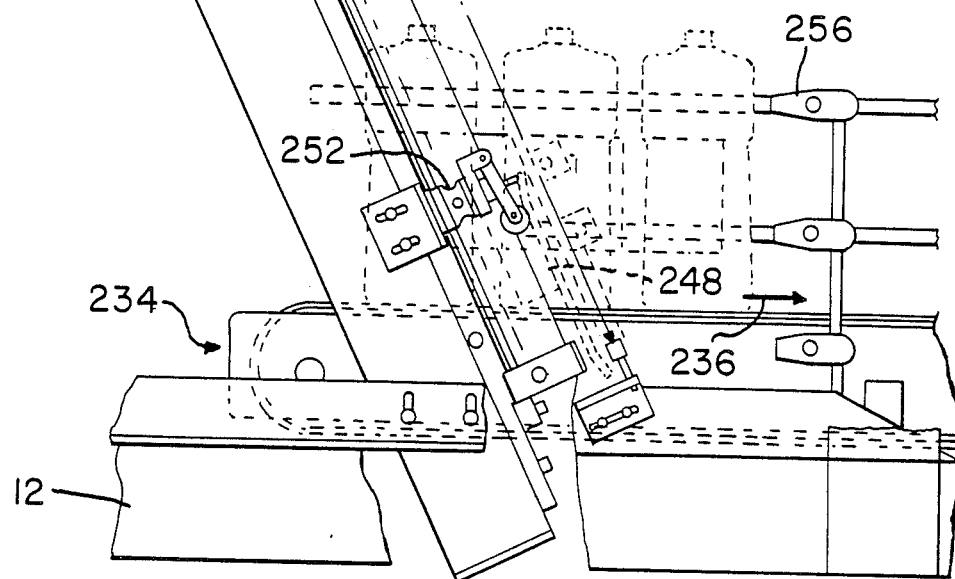
FIG. 20 is a view of the take away station taken along line 20—20 of FIG. 1.

The tooling at the discharge station 24 is illustrated at FIGS. 20 and 21 and includes an elongate and downwardly slanted rodless air cylinder 230 mounted on a support member 232 extending between portions of frame 12. Take away conveyor 234 is located at the bottom of the cylinder and includes an upper run moving downstream in the direction of arrow 236. As illustrated in FIG. 1, take away conveyor 234 is spaced radially outwardly of the circumferential path of the bottles carried by the transfer units 16 on turntable 14. Mounting plate 238 is connected to the piston of cylinder 230 and supports a transversely oriented air cylinder 240, the piston rod of which is connected to a transfer plate 242, similar to transfer plate 42 and carrying three pairs of suction cups 244, similar to indexing suction cups 44. As illustrated generally in FIG. 1, elevated plate 242 is located opposite the plate 42 of the unit 16 positioned at the discharge station. Guide pins 246 connected to the transfer plate extend through bores in a block on cylinder 240 to maintain the orientation of the transfer plate and suction cups. When cylinder 230 is retracted and plate 242 is in the raised position as shown in FIG. 20, extension of cylinder 240 moves the suction cups 244 into engagement with the bottles held on the transfer unit at the discharge station.

Mounting plate 238 carries a trigger actuator 248 which extends longitudinally a distance along the direction of movement of the plate along cylinder 230. When the cylinder is retracted as in FIG. 20 actuator 248 engages the trigger of air valve 250. When the cylinder is extended as shown in dotted lines in FIG. 20, the actuator engages the trigger of air valve 252 located on the lower portion of support frame member 232.

Operation of the Apparatus

The operation of the apparatus will now be described by following a group of three bottles from mold halves 28 through the extraction, rotation, trim and discharge stations and to the take away conveyor 234.

Figure 5:
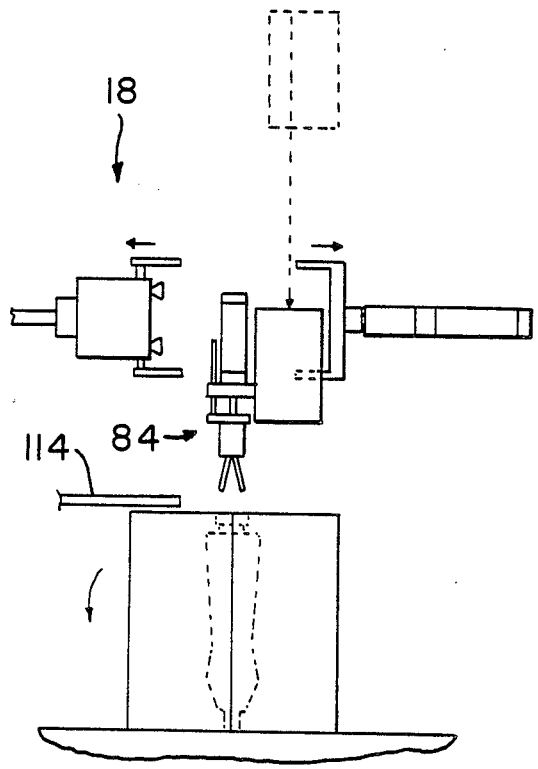
FIGS. 5-8 are views similar to FIG. 4 showing the operation of the extraction station tooling.
Figure 6:
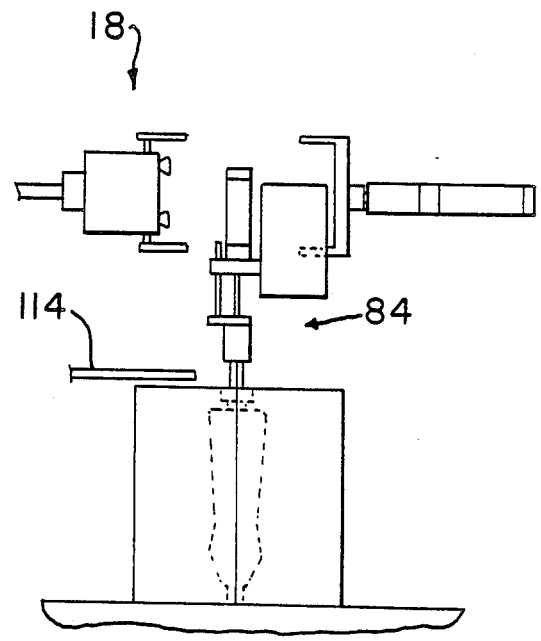

The blow molding machine adjacent apparatus 10 moves a closed pair of mold halves 28 with blow molded bottles confined therein to the extraction station 18 as shown in FIG. 5. with the mold halves in place, cylinders 80 are extended to lower the retracted bottle gripping assemblies 84 to the position of FIG. 5. Tray 114 is retracted. Cylinders 86 are extended to lower the open fingers 88 into the recesses 40 and over the tail flash. Cylinder 89 then close the fingers on the flash. See FIG. 6.

Figure 3:
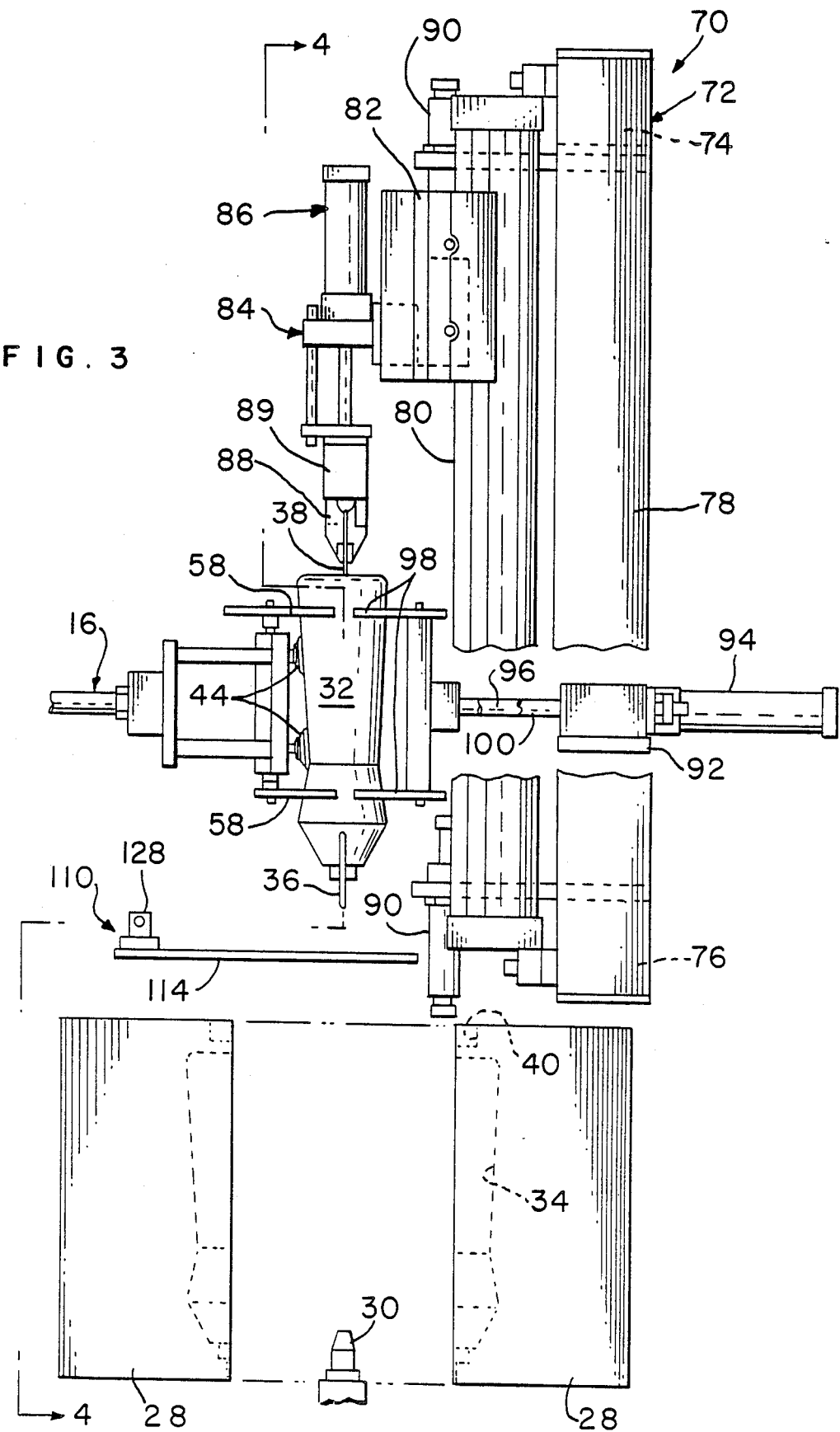
FIG. 3 is a view taken along line 3—3 of FIG. 1 showing the extraction station tooling.
Figure 7:
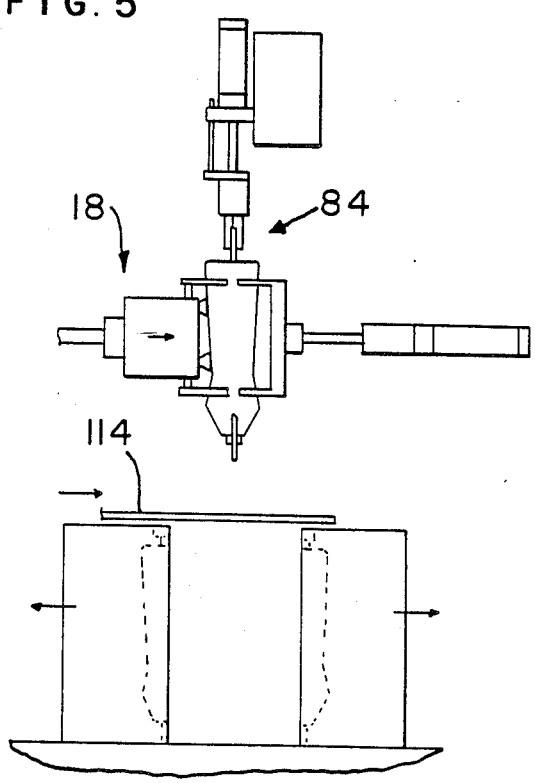

The blow molding machine then opens the mold halves following which cylinders 80 are reversed to raise the clamped, inverted bottles along a path to the upper pickup position as shown in FIGS. 3 and 7.

By the time the bottles are in the pickup position as shown in FIG. 7, the drive for turntable 14 has positioned a transfer unit 16 at the extraction station 18 with cylinder 46 retracted and the nest plates 58 and suction cups 44 in position to engage the outer surfaces of the raised, inverted bottles. The turntable dwells during pickup of the bottles at the extraction station.

Figure 8:
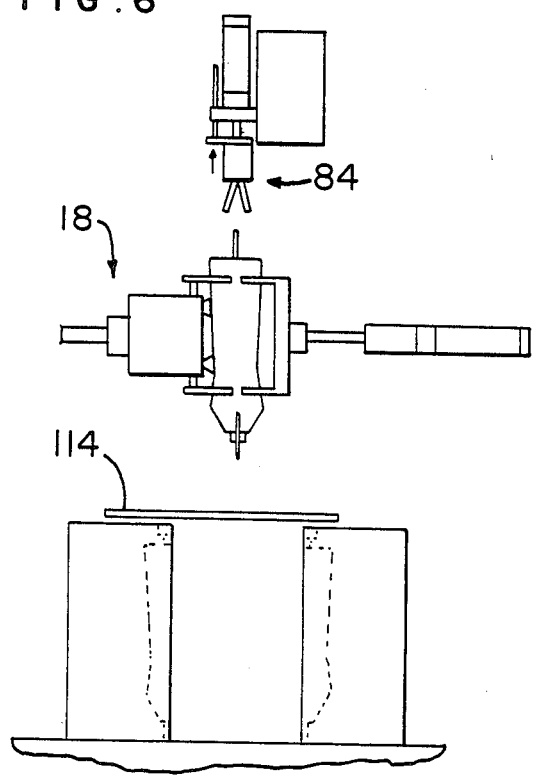

Pickup of the bottles is achieved by extending cylinders 46 and 94 so that the three bottles are accurately positioned within the recesses in the opposed pairs of nest plates 58 and 98. See FIG. 3. Following clamping and orientation of the bottles by the plates 58 and 98 vacuum is supplied to suction cups 44 to hold the bottles on the transfer unit in plates 58. Cylinder 89 open the fingers and cylinders 86 are then retracted to return the open fingers to the elevated position of FIG. 8. Next cylinder 94 is retracted to move the nest plates 98 radially outwardly away from the supported, aligned bottles, completing extraction and transfer of the bottles to unit 16.

When the bottles are lifted up along the path to the pickup position of FIGS. 3 and 7 cylinder 124 in the reject-take away assembly 110 is extended at the same time cylinders 46 and 94 are extended to move tray 114 across the path and beneath the bottles, so that it is over the blow molding machine and adjacent to conveyor 142. The tray is in place to prevent any misformed bottles or "globs" from falling down into the blow molding machine, commonly between the open mold halves 28, upon opening of the gripping fingers 88.

Occasionally, most frequently during start up of the blow molding machine, a parison in a mold cavity is not properly blow molded thereby creating a misshapen plastic body in the cavity having tail flash extending into the extraction recess 40. During extraction, the fingers 88 engage this flash and raise the imperfectly formed body as described. However, the suction cups 44 cannot grip the plastic body so that upon opening of the fingers the body will, unless prevented, drop into the blow molding machine, most commonly onto or between the mold halves. Positioning of the tray 114 beneath the gripping fingers 88 assures that in the event a bottle is imperfectly formed and not picked up by the vacuum cups, the plastic body will fall on the tray and be safely swept away.

During indexing of the transfer unit from the extraction station to the rotation station cylinder 128 of the reject-take away assembly 110 is extended to move wiper 134 downstream along the tray thereby wiping any imperfectly formed plastic body dropped on the tray onto the discharge conveyor 142 for transport to a disposal receptacle. After the downstream sweep, both cylinders 124 and 128 are retracted to return the take away assembly to the position of FIG. 9 in which tray 114 is withdrawn out of the path of extraction of the next set of bottles. In some applications, the reject-take away assembly need only be used during start up of the blow molding machine.

Upon extraction of the bottles from the mold halves and transfer to unit 16, the drive for turntable 14 indexes the turntable 90 degrees in the direction of arrow 26 to move the extended transfer unit and bottles to the rotation station 20. During the dwell period when the unit is at this station cylinder 50 is actuated to rotate the transfer plate 42 and held bottles 32 through 180 degrees, thereby moving the bottles from the inverted position of FIG. 3 to the upright position as shown in FIG. 14 with the neck flash 36 at the tops of the bottles and tail flash 38 at the bottoms of the bottles. It is not necessary that the bottles be rotated during the dwell interval while the transfer unit is at the rotation station 20. Apparatus 10 may be programmed to rotate the bottles upright during rotary movement of the transfer unit from the extraction station to the trim station, provided, of course, that the transfer unit and bottles rotate free of other portions of the machine.

Following rotation of the bottles at station 20 the turntable 14 is indexed to move the transfer unit and upright bottles to the trim station 22 as shown in FIG. 14 with the shoulder flash 36 located between trim plate 210 and the top of bottle nests 176 and the tail flash 38 located between trimming plate 224 and backup plate 196.

The sequence of operation of the trim station is illustrated in FIGS. 14, 17 and 18. Flash is trimmed from bottles 32 positioned in the tooling at the trim station 22 during the dwell of the turntable by first extending cylinder 172 to move nests 176 and backup plate 196 from the position of FIG. 14 to the position of FIG. 18 so that the adjacent sides of the bottles are snugly seated within the concave surfaces or recesses 180 in the nests and the plate is flush on tail flash 38. In this position, the bottles are accurately located between the nests and nest plates 58 to assure that flash is trimmed away close to the surface of the bottles but without injury to the bottles.

Figure 4:
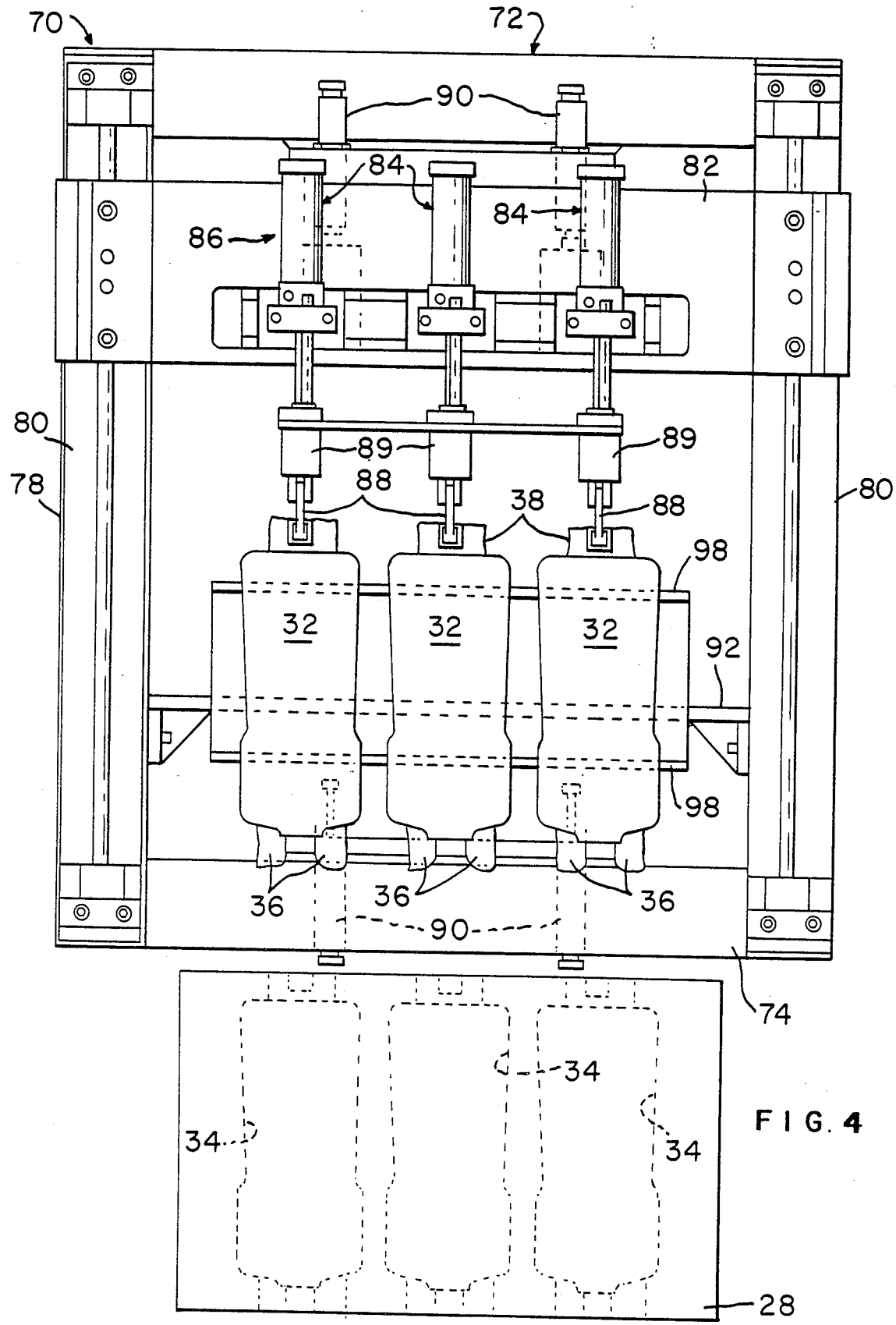
FIG. 4 is a sectional view taken generally along line 4—4 of FIG. 3.

Following extension of cylinder 172 cylinders 202 and 220 are extended to trim the shoulder flash 36 and tail flash 38 from the bottles as shown in FIG. 19. Extension of cylinder 202 moves plate 206 and cutting tooling 214 past the shoulders of bottles 34 thereby neatly severing away the neck flash 36. The close fit between the bottle and tooling assures that both portions of neck flash on each bottle are severed from the bottle flush to the bottle surface. FIG. 4 illustrates the bottle as withdrawn from the mold 28 and shows that each bottle carries two portions of neck flash 36 and a single tail flash portion 38.

The shoulders of the bottles extend into mouth 186 of flash discharge chute 156. Extension of the cylinder 202 drives plate 210 and tooling 214 past the shoulders, through the mouth and into the chute thereby driving the severed flash 36 into the chute as shown in FIG. 19.

The flash falls down the chute and through discharge opening 190 into a suitable receptacle.

Extension of cylinders 220 moves the trimming plate 224 against the tail flash 38 so that the flash is captured between the clamping projection 226 and backing plate 196 and, with further extension of the cylinders, is trimmed smoothly away from the bottoms of the bottles as plate 196 is moved with the trimming plate and springs 198 are compressed. After trimming, cylinders 202 and 220 are retracted to return the tooling to the position shown in FIG. 14. With retraction of the trimming plate from plate 196 the severed tail flash 38 falls down through discharge opening 254 in plate 162 and into a suitable receptacle. Cylinder 172 is retracted with cylinders 202 and 220, thereby freeing the trimmed bottles for rotation by turntable 14 from the trim station 22 to the discharge station 24.

FIG. 20 illustrates three trimmed bottles 32 as moved to the discharge station 24 by the turntable. The bottles are carried on transfer unit 16 and are opposite and spaced a short distance radially inwardly of raised transfer plate 242. During the dwell of turntable 14 at the station air cylinder 240 is extended to move plate 242 toward the bottles so that the suction cups 244 carried by the plate engage the bottles 32. Vacuum is applied to cups 244 to secure the bottles to the bottle transfer unit 228. After the bottles have been captured by suction cups 244 the vacuum supplied to indexing suction cups 44 of the transfer unit 16 is released thereby breaking the connections between the bottles and the unit. Cylinder 46 is then retracted to move cups 44 radially inwardly and away from the bottles. The transfer cylinder 50 is then actuated to rotate transfer plate 42 180 degrees back to the initial position for receiving the next set of bottles at the extraction station 18.

Upon retraction of cylinder 46 cylinder 230 is extended to lower the bottles from the solid line position at the top of the cylinder shown in FIG. 20 to the dotted line position at the bottom of the cylinder where the bottles rest vertically on the belt of conveyor 234. The angled descent moves the bottles in a downstream direction along the conveyor as they are deposited on the conveyor, thus reducing shocks and the potential for injury to the empty bottles. Guides 256 may be provided on both sides of the conveyor to support the bottles against falling. When the bottles reach the conveyor cylinder 240 is retracted and vacuum supplied to cups 244 is relieved. The conveyor moves the bottles downstream in the direction of arrow 236.

Cylinder 230 rapidly lowers the transfer plate and bottles by exhausting air to atmosphere. As the plate approaches the bottom of its stroke trigger actuator 248 engages the trigger of valve 252 thereby shifting the valve to restrict the exhaust flow and gradually slow the descent of the cylinder and bottles. In this way the bottles moved down to the conveyor quickly and are yet provided with a gentle landing on the conveyor. Also, the cylinder itself is not stressed by abrupt bottoming. After the bottles have been released for downstream movement along conveyor 234 cylinder 230 is retracted to return plate 242 to the raised position. During the end of the return stroke trigger actuator 248 engages the trigger of valve 250 to slow the cylinder and plate thereby reducing stresses.

After the bottles carried to the discharge station by transfer unit 16 have been picked up by unit 228 and the transfer unit has been rotated 180 degrees back to the initial position, the turntable drive indexes the turntable 90 degrees to return the transfer unit to the extraction station and complete the cycle of operation.

The operation rate for apparatus 10 is in large part dependent upon the rate at which the blow molding machine delivers closed mold halves and molded bottles to the extraction station. With a suitably fast blow molding machine apparatus 10 can cycle at a rate that rotates the turntable through 360 degrees in a total of about eight seconds or less so that when use with molds having three bottle cavities trimmed bottles are deposited onto the discharge conveyor at a rate of ninety bottles per minute. The apparatus 10 may be used with a rotary or shuttle type blow molding machines, although its high production capability is best suited for use with a rotary blow molding machine.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. Apparatus for extracting a blow molded plastic bottle from a blow mold and transferring the bottle to a bottle holder comprising:
    (a) a bottle gripping assembly for gripping a blow molded plastic bottle in a mold and releasing a bottle held in a pickup position;
    (b) first drive means for moving the assembly and a gripped bottle along a path extending from a blow mold to the pickup position; and
    (c) a tray located beneath the pickup position to catch deformed bottles falling down from such position upon release from the gripping assembly.

2. Apparatus as in claim 1 wherein the pickup position is located at the top of the path and including a tray drive for moving the tray back and forth between a first location beneath the pickup position and intersecting the path and a second location remote from the path.

3. Apparatus as in claim 2 including a device for removing deformed bottles from the tray.

4. Apparatus as in claim 3 wherein said device comprises a wiper and including a wiper drive for moving the wiper along the tray to push deformed bottles from the tray.

5. Apparatus as in claim 4 wherein the tray is essentially horizontal when at the first location.

6. Apparatus as in claim 4 wherein said bottle gripping assembly includes flash gripping fingers and third drive means for opening and closing the fingers.

7. Apparatus as in claim 4 including first bottle alignment means at the pickup position for orienting the bottles prior to release from the gripping assembly.

8. Apparatus as in claim 7 including a bottle holder at the pickup position and second bottle alignment means on the bottle holder and wherein said first and second alignment means engage opposite sides of a bottle.

* * * * *